United States Patent [19]

Kim

[11] Patent Number: 5,604,416
[45] Date of Patent: Feb. 18, 1997

[54] BATTERY DISCHARGE CIRCUIT WHICH PROTECTS AGAINST EXCESSIVE DISCHARGE

[75] Inventor: Byoung-ha Kim, Suwon, Rep. of Korea

[73] Assignee: Samsung Electronics Co., Ltd., Kyungki-Do, Rep. of Korea

[21] Appl. No.: 352,089

[22] Filed: Nov. 30, 1994

[30] Foreign Application Priority Data

Dec. 31, 1993 [KR] Rep. of Korea ............... 93-32024

[51] Int. Cl.$^6$ ........................................... H01M 10/46
[52] U.S. Cl. ............................. 320/13; 320/29; 320/21
[58] Field of Search ........................... 320/13, 21, 29, 320/39, 40, 48, 51, 54

[56] References Cited

U.S. PATENT DOCUMENTS 5,355,072  10/1994  Satsuma et al. ................ 320/13
5,471,128  11/1995  Patino et al. ................... 320/13
5,477,124  12/1995  Tamai ........................... 320/13

*Primary Examiner*—Edward H. Tso
*Attorney, Agent, or Firm*—Sughrue, Mion, Zinn, Macpeak & Seas

[57] ABSTRACT

A battery discharge circuit includes a discharge switch for turning a discharge function on and off, a triggering circuit for triggering the discharge function when the discharge switch is on, a setting circuit for setting a discharge lower limit voltage, a discharging circuit for discharging a battery to the discharge lower limit voltage by being triggered by the triggering circuit, and a display for displaying the discharge operation of the discharging circuit. The battery discharge circuit discharges a battery to a predetermined voltage in order to prolong the life of the battery.

4 Claims, 3 Drawing Sheets

5,604,416

1

BATTERY DISCHARGE CIRCUIT WHICH PROTECTS AGAINST EXCESSIVE DISCHARGE

BACKGROUND OF THE INVENTION

The present invention relates to a battery discharge circuit, and more particularly, to a battery discharge circuit which displays the discharge status while the battery is being discharged and which protects against excess discharge.

In general, batteries are connected to household electronic appliances to provide portability. In order to extend the life of batteries used in electronic appliances such as a camcorder, circuits are required for discharging the batteries. That is to say, according to the prior art, when batteries which have been used in a camcorder are to be recharged, battery life is prolonged by discharging the used batteries to a predetermined voltage prior to charging. However, excess discharging shortens battery life.

SUMMARY OF THE INVENTION

It is an object of the present invention to provide a battery discharge circuit which displays the discharge status of batteries, thereby notifying a user of the status, and which prevents excess discharge, thereby lengthening the battery life.

To accomplish the above object, the battery discharge circuit according to the present invention comprises: a discharge switch for turning a discharge function on and off; triggering means for triggering the discharge function when the discharge switch is on; setting means for setting a discharge lower limit voltage; discharging means for discharging the battery to the discharge lower limit voltage by being triggered by the triggering means; and display means for displaying the discharge operation of the discharging means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
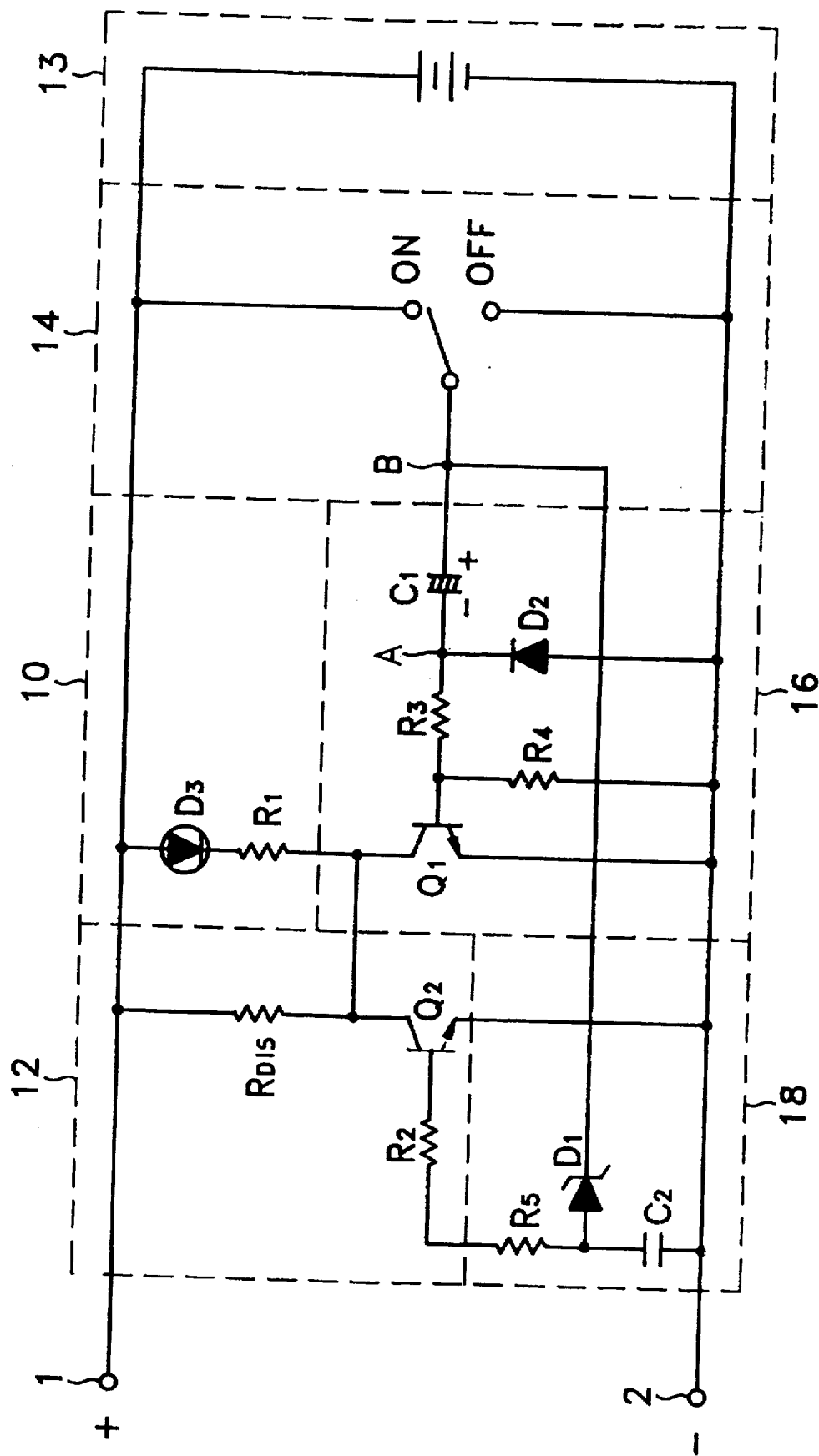
FIG. 1 is a circuit diagram of the battery discharge circuit according to an embodiment of the present invention.

In FIG. 1, battery discharge circuit having a discharge switch 14, a trigger 16, a discharge lower limit voltage setter 18, a discharger 12 and a discharge display 10, discharges a battery 13, which has been partially discharged through use, to the discharge lower limit voltage before recharging. Operative port of a discharge switch 14 is connected to capacitor C1 and Zener diode D1, fixed port ON is connected to a battery 13 and positive input terminal 1, and fixed port OFF is connected to battery 13 and negative input terminal 2. Trigger 16 including capacitor C1 whose one end is connected to operative port of switch 14, resistance R3 connected to the other end of capacitor C1, transistor Q1 whose base is connected to resistance R3, whose collector is connected to discharge resistance RDIS and whose emitter is connected to negative input terminal 2, resistance R4 connected between the emitter and base of transistor Q1, and diode D2 connected between node A of resistance R3 and capacitor C1, and negative input terminal 2, starts discharge through discharge resistance RDIS with transistor Q1 being temporarily turned "ON" in an initial stage of discharge switch 14 being turned "ON," and charges capacitor C1. The connection point of the operative port of capacitor C1 and switch 14 and the Zener diode D1 is called node B.

Discharge display 10 having light-emitting diode D3 connected to positive input terminal 1 and resistance R1, displays that discharge is being performed by emitting light during the discharging process. Discharge lower limit voltage setter 18 includes Zener diode D1 connected to node B, resistance R5, and capacitor C2. The discharge lower limit voltage setter 18 turns transistor Q2 on by applying a forward bias to transistor Q2 through resistances R5 and R2, since Zener diode D1 is turned on if the voltage of battery 3 is higher than the discharge lower limit voltage set as the reference voltage of Zener diode D1. The discharge lower limit voltage setter 18 turns transistor Q2 off, since Zener diode D1 is turned off if the voltage of battery 3 is lower than the discharge lower limit voltage. Discharger 12 including resistance R2, transistor Q2, and a discharge resistance RDIS, which are connected to discharge lower limit voltage setter 18, starts discharge through discharge resistance RDIS by means of trigger 16 and terminates discharge depending on the output of discharge lower limit voltage setter 18. That is to say, if Zener diode D1 is turned on, thereby turning transistor Q2 on, discharge is continued through resistance RDIS, and light-emitting diode D3 of discharge display 10 is turned on, thereby displaying that discharge is being performed. If Zener diode D1 is turned off, thereby turning transistor Q2 off, discharge is terminated, thereby turning light-emitting diode D3 off.

In other words, after battery 13 is used, if it is separated from the body of camcorder and discharge switch 14 is turned on, voltage of node A becomes higher instantaneously due to the triggering operation of capacitor C1, thereby instantaneously turning on transistor Q1. If transistor Q1 is turned on, discharge is initiated through resistance RDIS, thereby turning on light-emitting diode D3. If the voltage of node B is higher than the reference voltage of Zener diode D1, transistor Q2 is turned on by the current flowing toward Zener diode D1, thereby turning on light-emitting diode D3, and discharge is continued through discharge resistance RDIS. At this time, if the voltage of node B drops to the reference voltage of Zener diode D1 or below, Zener diode D1 is turned off, so that transistor Q2 is turned off. Therefore, discharge is turned off and light-emitting diode D3 is turned off. Charging is performed when switch 14 is turned off. If switch 14 is on at charging time, discharge occurs continuously through discharge resistance RDIS. However, if the reference voltage of Zener diode D1 is set properly, discharge is performed until battery voltage reaches the discharge lower limit voltage, thereby preventing excess discharge.

Figure 2A:
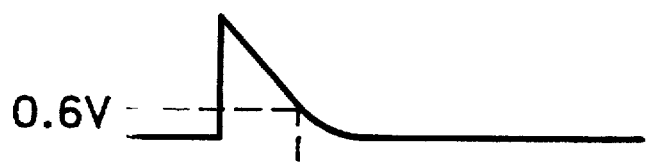
FIGS. 2A to 2F are waveform diagrams showing the operational waveforms of various parts shown in FIG. 1.
Figure 2B:
Figure 2C:
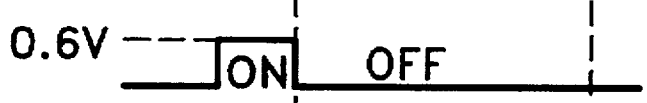
Figure 2D:
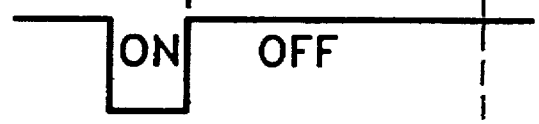
Figure 2E:
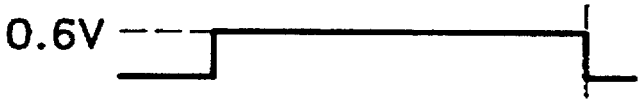
Figure 2F:

FIGS. 2A to 2F are waveform diagrams showing operational waveforms of voltages present at various points of the circuit shown in FIG. 1. FIG. 2A shows a voltage waveform at node A of FIG. 1 when discharge switch 14 is turned on. Upon switching discharge switch 14 on, the voltage is instantaneously increased and then falls off through capacitor C1. FIG. 2B shows a signal waveform at node B of FIG. 1 when discharge switch 14 is turned on. Here, upon switching discharge switch 14 on, discharge is initiated to reach the discharge lower limit voltage (in this embodiment, 5 V) set by Zener diode D1. FIG. 2C is a waveform diagram showing the voltage applied to the base of transistor Q1 shown in FIG. 1. If the voltage of node A (FIG. 2A) is 0.6 V or higher, transistor Q1 is turned on. FIG. 2D is a waveform diagram showing the on/off state between the collector and emitter of transistor Q1 of FIG. 1 and shows that transistor Q1 is turned on initially and then is turned off later. FIG. 2E is a waveform diagram showing the voltage applied to the base of transistor Q2 of FIG. 1 and shows that transistor Q2 is turned on until the battery voltage reaches the discharge lower limit voltage after discharge switch 14 is turned on. FIG. 2F is a waveform diagram showing the on/off state between collector and emitter of transistor Q2 of FIG. 1 and shows that discharge is performed through discharge resistance RDIS during the "ON" period of the LED, thereby turning light-emitting diode D3 on. When the battery voltage drops below the discharge lower limit voltage, Zener diode D1 is turned off, thereby stopping discharge and turning off the light-emitting diode D3.

Figure 3:
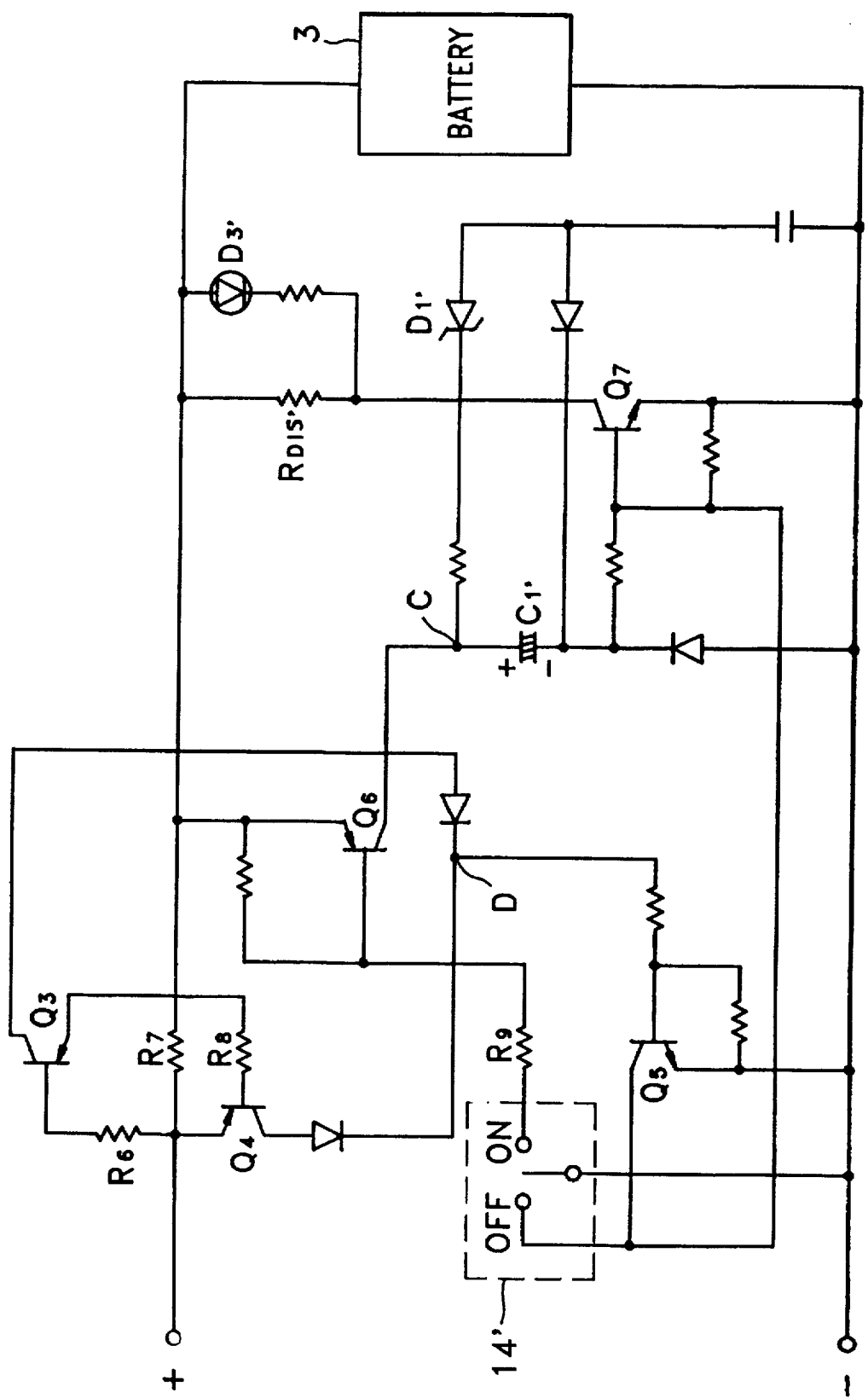
FIG. 3 is a circuit diagram showing another embodiment of the present invention.

FIG. 3 is a circuit diagram according to another embodiment of the present invention. The circuit solves the problem of the battery being continuously discharged when the battery is charged with discharge switch 14' on. The circuit prevents discharge through discharge resistance RDIS' at charging time, by using a charge/discharge detector consisting of resistances R6, R7 and R8 and transistors Q3 and Q4.

In FIG. 3, transistor Q3 is a driving transistor for detecting discharge, transistor Q4 is a driving transistor for detecting charge, and resistance R7 is for detecting current.

The circuit shown in FIG. 3 operates as follows. If discharge switch 14' is turned on, transistor Q6 is turned on. Accordingly, the voltage at node C increases and transistor Q7 is temporarily turned on through capacitor C1'. If transistor Q7 is turned on, the voltage of battery 3 is discharged through discharge resistance RDIS' and light-emitting diode D3' is turned on, thereby displaying that a discharge operation is being performed. If the voltage of battery 3 is higher than the reference voltage of Zener diode D1', transistor Q7 is continuously on, thereby performing discharge. If the voltage of transistor Q7 is lower than the reference voltage of Zener diode D1', Zener diode D1 is turned off, thereby turning transistor Q7 off, terminating discharge and turning light-emitting diode D3' off.

Meanwhile, if charging is performed while discharge switch 14' is on, that is, if charging and discharging functions are on at the same time, transistor Q4 is on at charging time, and transistor Q3 is on at discharging time, thereby increasing the voltage at node D. Accordingly, transistor Q5 is on, so that the collector voltage becomes low. Therefore, a "low" is applied to the base of transistor Q7, thereby turning the transistor Q7 off, interrupting discharging, and allowing battery 3 to charge.

That is to say, transistor Q4 is turned on at charging time and transistor Q3 is turned on at discharging time, thereby the voltage at node D becomes high. Therefore, transistor Q5 is on and the collector voltage goes low, thereby a "low" is applied to the base of transistor Q7, turning it off. After charging is terminated, if discharge switch 14' is switched on, transistor Q6 is turned on and the voltage at node C becomes high. Then, by means of the triggering operation of capacitor C1', transistor Q7 is instantaneously turned on. Therefore, light-emitting diode D3' is turned on, and discharge is started through discharge resistance RDIS'. Also, current flows from node C to Zener diode D1' and transistor Q7 is continuously on. If the voltage of battery 3 goes lower than the reference voltage of Zener diode D1' over time, Zener diode D1' is turned off and transistor Q7 is turned off, thereby interrupting discharge. If the reference voltage of Zener diode D1' is set properly, discharge does not occur at the discharge lower limit voltage or below.

As described above, the battery discharge circuit according to the present invention enhances user convenience by displaying discharge status and prolongs the life of a battery by preventing excessive discharge.

What is claimed is:

1. A battery discharge circuit comprising:

a discharge switch for turning a discharge function on and off;

triggering means for triggering said discharge function when said discharge switch is turned on;

a Zener diode which sets a discharge lower limit voltage;

discharging means for discharging a battery to said discharge lower limit voltage by being triggered by said triggering means; and display means for displaying the discharge operation of said discharging means.

2. A battery discharge circuit comprising:

a discharge switch for turning a discharge function on and off;

triggering means for triggering said discharge function when said discharge switch is turned on;

setting means for setting a discharge lower limit voltage;

discharging means for discharging a battery to said discharge lower limit voltage by being triggered by said triggering means; and display means for displaying the discharge operation of said discharging means;

wherein said triggering means includes:

a capacitor whose end is connected to said discharge switch;

a first resistance connected to the other end of said capacitor;

a transistor having a base connected to said first resistance, a collector connected to a discharge resistance and an emitter connected to a negative terminal;

a second resistance connected between the emitter and the base of said transistor; and a diode connected between the node of said first resistance and said capacitor and the negative terminal.

3. A battery discharge circuit comprising:

a discharge switch for turning a discharge function on and off;

triggering means for triggering said discharge function when said discharge switch is turned on;

setting means for setting a discharge lower limit voltage;

discharging means for discharging a battery to said discharge lower limit voltage by being triggered by said triggering means; and display means for displaying the discharge operation of said discharging means;

wherein said discharging means includes a transistor being switched on and off by said discharge lower limit voltage setting means and a discharge resistance connected to a positive terminal of said battery for forming a discharging path.

4. A battery discharge circuit comprising:

a discharge switch for turning a discharge function on and off;

triggering means for triggering said discharge function when said discharge switch is turned on;

setting means for setting a discharge lower limit voltage;

discharging means for discharging a battery to said discharge lower limit voltage by being triggered by said triggering means;

display means for displaying the discharge operation of said discharging means; and charging/discharging detecting means for detecting a charge operation and a discharge operation of said battery, thereby interrupting the discharge operation of said discharging means at charging time, wherein charge is enabled when said discharge switch is on.

* * * * *